United States Patent [19]

Kress et al.

[11] Patent Number: 5,138,243

[45] Date of Patent: Aug. 11, 1992

[54] SWITCHING DEVICE FOR THE ELECTRIC SWITCHING OF ELECTRIC TOOLS

[75] Inventors: Willy Kress; Alfred Binder, both of Bisingen, Fed. Rep. of Germany

[73] Assignee: Kress-Elektrik GmbH & Co., Bisongen, Fed. Rep. of Germany

[21] Appl. No.: 551,483

[22] Filed: Jul. 11, 1990

[30] Foreign Application Priority Data

Jul. 15, 1989 [DE] Fed. Rep. of Germany ....... 3923421
Feb. 14, 1990 [DE] Fed. Rep. of Germany ....... 4004463

[51] Int. Cl.$^5$ ...................... H01R 39/44; H02P 7/50; H02K 23/66
[52] U.S. Cl. .................................... 318/541; 318/292; 388/836; 310/229
[58] Field of Search ............... 318/280, 292, 541, 542; 310/47, 50, 68 A, 115, 116, 117, 118, 229, 230, 239, 241; 200/1; 388/835, 836

[56] References Cited

U.S. PATENT DOCUMENTS

| | | |
|---|---|---|
| 1,043,325 | 11/1912 | Lincoln . |
| 4,085,345 | 4/1978 | Bullat ................... 310/117 |
| 4,342,931 | 8/1982 | Grossman et al. .............. 310/50 |
| 4,581,499 | 4/1986 | Cousins ................... 200/1 |
| 4,772,765 | 9/1988 | Markle et al. ............... 200/1 |
| 4,949,023 | 8/1990 | Shlien ................... 318/541 |
| 4,978,877 | 12/1990 | Quirijnen ................... 310/239 |

Primary Examiner—Bentsu Ro
Attorney, Agent, or Firm—Darby & Darby

[57] ABSTRACT

It is proposed to obtain a switching device for the electrical switching (i.e. switching on and off or reversing the direction of rotation) of electric tools, especially electric hand tools such as drills, grinders and the like, by mounting a rotatable setting ring on the outer cylindrical housing of the electric tool and positioning it opposite the end shield at the B-end of the electric motor inside the housing in such a manner that inwardly pointing projections of the setting ring will grip a plate or switching ring on the electric motor and will cause the said plate or switching ring to perform a slave motion for switching the electric motor on and off or reversing its direction of rotation whenever the external setting ring is subjected to a manual rotation. It is also possible and advantageous to provide an automatic return to bring the setting ring back into its initial position; the mechanism, realized with biasing springs, comprises a releasable locking device that will maintain the setting ring in its deflected position.

19 Claims, 2 Drawing Sheets

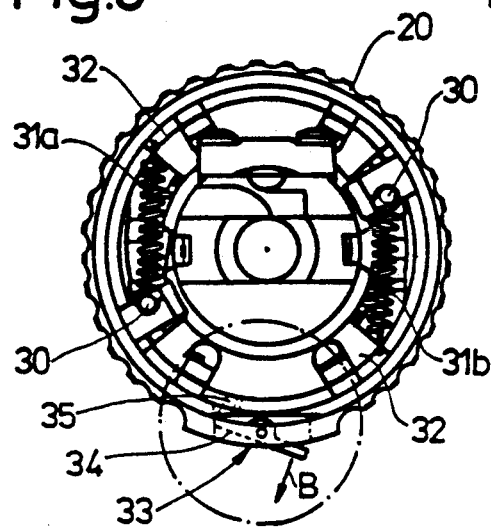
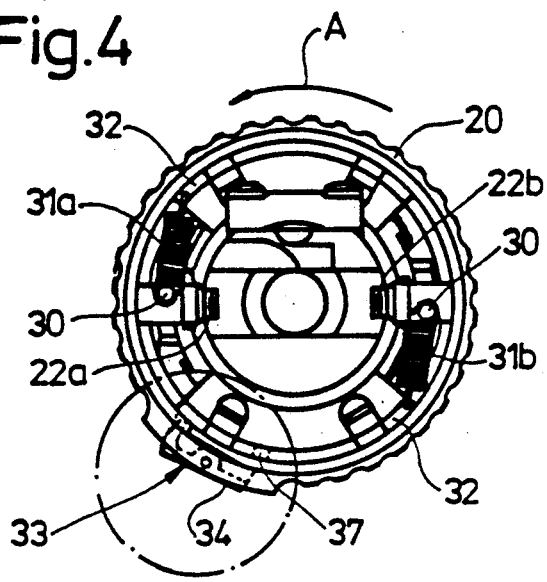
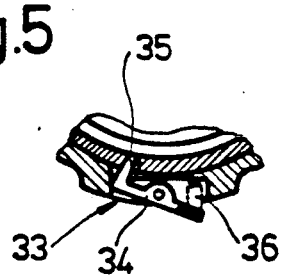
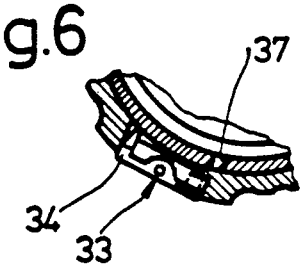
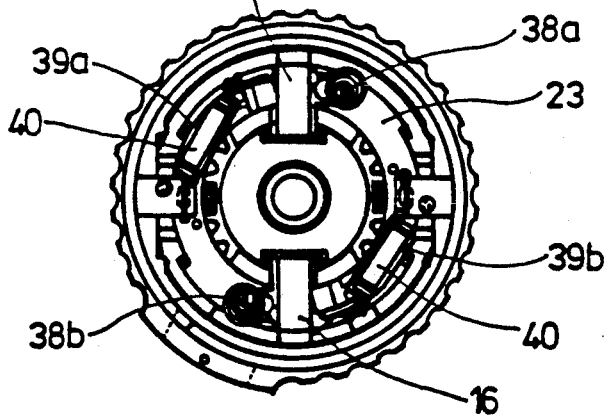
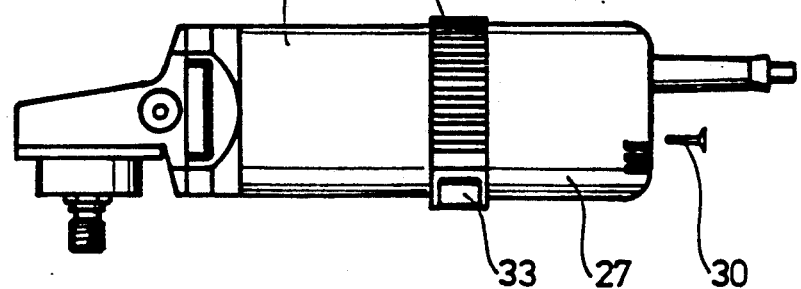

SWITCHING DEVICE FOR THE ELECTRIC SWITCHING OF ELECTRIC TOOLS

BACKGROUND OF THE INVENTION

The present invention relates to a switching device.

It is normal practice for electric tools, especially electric hand tools, to be switched on and off with the help of, for example, tumbler switches, possibly with a rocker-like structure, or sliding switches, these switches being either fixed in a suitable manner on the outside of the housing or so arranged that only their actuating parts project through openings in the housing and can therefore be appropriately operated by the user. In many electric hand implements, drills, hammer drills and the like being cases in point, it is also customary to combine the switching on and off with a speed control by mounting a sliding switch in the manner of a pistol grip, so that a finger can be placed around it; the implement will then be switched on by the initial movement of the switch, while subsequent free displacements of the slide serve—for example—to operate a potentiometer, which could also form part of a phase control circuit, so that the speed of revolution of the motor driving the electric hand tool can be increased until the slide comes up against its stop.

Reversal of the direction of rotation is also a customary feature of numerous electric hand tools, screwdrivers being a case in point, because screws can then be either driven or removed. Normally this is likewise done by simple electric switching of the current supply to the stator and/or the brushes, although this is not an optimal solution as far as the efficiency is concerned, because in the latter case one should really arrange for a mechanical/geometric displacement of the brushes through specified angular amounts. Apart from this external switchgear, it is also known (DE-OS 36 06 926) for the circuitry of electric hand tools to be built up with the help of plug-in components, so that wiring requirements become reduced and a large number of conducting parts, including components for direction reversal and switching on and off, assume the form of conducting links that can be inserted in appropriate plastic parts, including housing parts, and—where appropriate—be incorporated in such parts already during manufacture. In this known electric hand tool in the form of a hand drill (DE-OS 36 06 926), the elements and conductors that make up the electric circuitry are designed in the form of block modules or units that can be plugged into each other.

In connection with electric hand tools it is also generally known (DE-PS 33 11 557) to arrange a bridge-like holding part at one end of the stator for the electric motor of a hand tool, a part that can also be described as a motor bridge. This motor bridge is intended to position and sustain the roller bearing for the rotor shaft that is supported in this manner, and the bridge can be appropriately attached to the stator by arranging on the end face of the bridge a series of pins pointing in the direction of the stator, these pins making it possible for the motor bridge to be pinned into the stator and thus to be correctly aligned. At one and the same time, the motor bridge—with its seating aperture for the associated roller bearing of the rotor shaft—also ensures the final position that determines the air gap.

Now it is the object of the present invention to simplify the electrical switching—including, for example, the switching on and off and direction reversal, of an electric tool, especially an electric hand tool, and to obtain a drastic reduction in the wiring requirements of at least one of the switching processes by intervening directly in the motor's own wiring and/or the control possibilities that already exist in the motor.

ADVANTAGES OF THE INVENTION

The electric tool according to the invention solves this problem by means of the characterizing features of claim 1 and has the advantage that an electric hand tool offers a clearly actuable setting device for at least one of the electric switching possibilities, by means of which it is possible to realize—for example—the switching on and off of the implement and/or a direction reversal by intervening directly in a setting area of the motor driving the electric hand tool, and doing this mechanically and from the outside and without any additional wiring connections. An electric motor suitable for the realization of the present invention will therefore comprise internal switching and/or setting elements, preferably an internal switching ring, so that such electrical switching actions can be obtained within the domain of the driving motor by means of limited rotary movements of the said switching ring. To this end the switching ring collaborates in an appropriate manner with the conductor paths arranged directly on the electric motor, preferably in a suitable punched grid, so that with each particular form of the punched grid the electric motor may be switched on and off or the optimal direction reversal may be obtained, together with the displacement of the brushes, by means of a movement of the internal switching ring.

In doing this, the present invention only seemingly accepts a presumed disadvantage consisting of the fact that the core piece of each and every electric hand tool, namely the electric driving motor, is a completely self-contained and appropriately encapsulated drive unit that comprises all the necessary bearings for the rotor shaft and the other individual motor components, all perfectly centered, complete with the aforementioned switching ring. Here one may advantageously use a universal motor as described in German utility model G 89 08 646.5 and in DE-OS 39 23 421. Having made specific reference to this available description, no detailed explanation of this universal motor will here be included, although it is to be understood that any other electric driving motor comprising a suitably designed switching ring is likewise suitable for the realization of the present invention.

The invention can be used with particular advantage when the housing itself is subdivided into several areas, though this subdivision should generally be in the axial direction of the electric hand tool, where a main part of the housing has a cylindrical, closed tubular structure, as is already known per se in the case of specially designed professional tools, into which one has to slide the drive unit until it comes to rest against its stop. Such a main housing of basically cylindrical structure constitutes a particularly suitable seat for arranging an internal setting ring or a possibly also open ring structure that is best guided by a form-fit on the inside of the housing and is only partly visible, or an external setting ring, which can then be of similarly circular shape and surround the tubular housing as a closed ring and where both setting ring forms have form-fitting radial projections that reach inwards to the switching ring and will therefore drag it with them when they themselves are manually displaced.

When one subdivides the housing into a main housing part and a cover part such that the latter can be attached to the former in the axial direction, one also creates in the transition between these two parts of the housing an area where the external setting ring can be mounted in a problem-free manner and kept in position by the rear cover.

An electric hand tool of this type can then be designed in such a manner that the gear mechanism of the particular electric hand tool under consideration, say the angle head of a right-angle grinder or the gearing head of a hand drill, is flange-mounted onto the output side of the self-contained, rigid and self-supporting unit of the electric driving motor, that is to say, mounted at the point where the end of the motor shaft projects beyond the end shield at the A-end on the driving side, the said end of the motor shaft being either itself designed as a gear wheel or carrying an appropriate pinion; the electric driving motor is then slid into the tubular protection housing, and the connection to the housing is obtained via borings on the side of the gearing head, so that the assembly—as it were—proceeds from the back and the electric motor, by means of an appropriate projection on its end shield, merely fits into a housing recess on the side away from the gearing mechanism, thus obtaining secure and preferably damped and resilient support also on this side.

Subsequently, the setting ring can be slid onto the housing—which is as yet open at the rear—until it comes to rest against the stop, thereby establishing the electrical switching connections to the motor. Assembly is then completed by adding the rear cover, whose forward annular edge engages with a corresponding annular groove in the setting ring, the rear cover itself coming to rest against a backwardly pointing, tapering projection of the main housing, to which it can also be screwed or otherwise attached. In this way the setting ring can be kept in position in an altogether unproblematical manner, because the engaged annular edge of the rear cover prevents it from sliding backwards, while it can be secured against sliding forward by arranging for the setting ring and the main housing to bear against each other at this point by means of stepped and mutually aligned annular grooves.

The setting ring will thus be seated on the outside of the tubular, closed housing body, with its inwardly pointing projections reaching—through openings in the housing—to the switching ring in the vicinity of the end shield at the B-end of the driving motor, with which it is aligned; it is therefore possible to displace the switching ring to reverse the direction of rotation or to switch the implement on and off.

Lastly, another advantageous feature of the present invention consists of the fact that when the setting ring is used as an instrument for switching the electric motor on and off, the setting ring comprises an automatic return mechanism with appropriately attached springs and can therefore be locked in the "on" position, namely by means of an external rocker with a hook-like projection that engages with a corresponding recess in the wall of the main housing; when the rocker is depressed, either by manual operation or by putting the electric tool down in a suitable position, the catch is released and the biasing springs of the switching ring will cause it to jump back into its original position.

BRIEF DESCRIPTION OF THE DRAWING

Various embodiments are shown in the drawing and will be discussed in greater detail in the description given hereinbelow. The figures included in the drawing are as follows:

FIG. 3 shows FIG. 2 as seen from the right and with the setting ring in its deflected position, while FIG. 4 shows the same view but with the setting ring in its rest position;

FIGS. 5 and 6 show details of the chain-dotted areas in FIGS. 3 and 4, i.e. the locking rocker of the setting ring in the engaged position (FIG. 5) and in the rest position (FIG. 6);

FIG. 7 is intended to facilitate understanding of the complete structure of the electric hand tool (right-angle grinder as a possible embodiment) and shows FIG. 1 as seen from the right, a view in which the internal switching ring of the electric motor can also be seen; and FIG. 8 shows a possible embodiment of an electric hand tool with an external setting ring.

DESCRIPTION OF THE EMBODIMENTS

The basic idea of the present invention is that of arranging a rotatable setting ring either on the outside or the inside of an electric tool, especially an electric hand tool, where the ring, situated in the area of the end shield at the B-end of the motor driving the electric hand tool, is capable of being rotated through given angular amounts in either one direction or the other and is provided with inwardly pointing projections that, passing through—for example—appropriately shaped openings in the motor housing, reach to the internal switching ring of the electric motor, so that, actuating the setting ring, it becomes possible to perform electrical switching actions directly in the domain of the electric driving motor.

Before discussing the invention in greater detail, attention should be drawn to the fact that a particularly preferred embodiment of an electromotive drive, namely a fully assembled, self-contained universal motor specially designed for the requirements of the present invention, has been extensively described in DE-GM G 89 08 646.5, the priority of which is claimed for the present patent, so that hereinafter this driving motor will be discussed only to the extent to which this is necessary to understand the invention, especially as regards the outer form of the unit. Be it noted, however, that the available description of this known driving motor is hereby expressly made part also of the disclosed subject matter of the description of the present invention and that reference is made to it.

Figure 1:
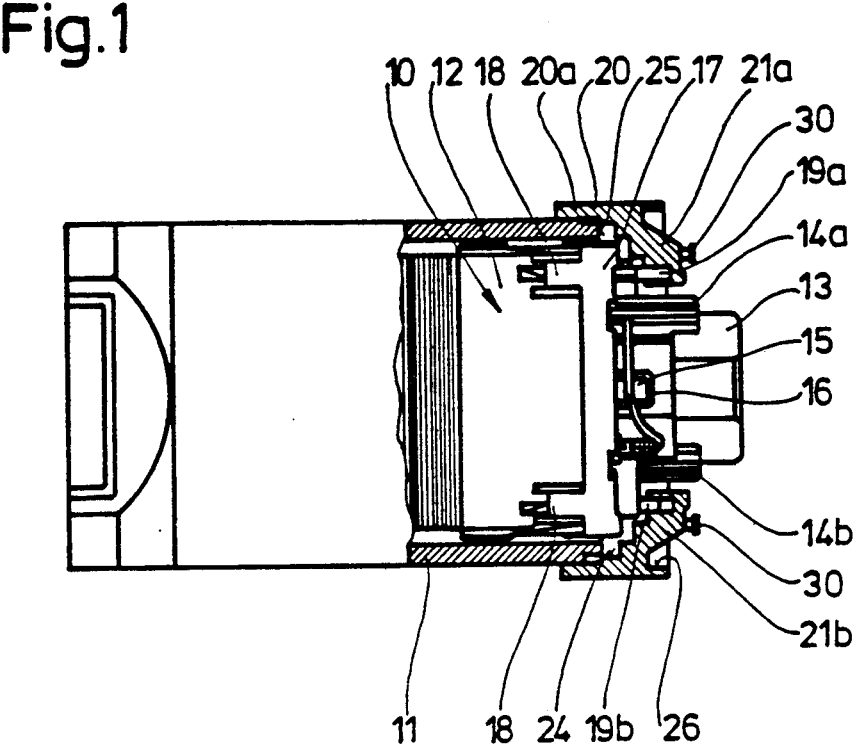
FIG. 1 shows, albeit not fully, a section through an electric driving motor accommodated in a tubular main housing (of a right-angle grinder) and through the setting ring and its mechanical interlock arrangements with the switching ring of the electric motor.

However, it should be understood that other universal motors are also suitable for the realization of the present invention, always provided that they comprise a rotatable switching ring that makes it possible for the electric motor to be appropriately switched. It should also be noted that the detailed description given hereinbelow is specifically concerned with the structure of a right-angle grinder and its mechanism for switching on and off, though it is to be under stood that the possibilities of electrically intervening in the operation of the driving motor offered by the present invention are also and even specially suitable for and can be applied to electric hand tools in which displacement of the setting ring makes it possible to reverse the direction of rotation, though no such reversal is needed in the case of the right-angle grinder here described. The incomplete view of FIG. 1 shows a universal electric motor 10 as a suitable source of driving power, the said motor being accommodated within a tubular main housing 11 (a feature to be discussed in greater detail further on) and having a generally cylindrical form. The end shield 12 at the B-end is so designed as to constitute a hub 13 for the rotor shaft bearing on this side, which—as a single piece—is held by the ribbed carriers 14a, 14b arranged on both sides. On an outwardly pointing outer annular surface (not visible in the drawing) there rests a rotatable switching ring that also carries the brushes 15 in brush holders 16, the said switching ring being visible in the top view of FIG. 7, where it is indicated by reference 23. A circlip 17, which is anchored to the end shield B 12 by means of the inwardly projecting locking lugs 18, secures this switching ring in position and prevents it from falling off in an axial direction.

With a view to causing the switching ring to perform the rotary motion that—as described in the previously mentioned utility model and the corresponding DE-OS 39 23 421—makes it possible to switch the electric motor on and off and to reverse its direction of rotation, the switching ring can be provided with the axial projections 19a, 19b, the projections making contact with an external setting ring 20 by virtue of the fact that the latter, in its turn, is provided with the inwardly pointing projections 21a, 21b that encompass the projections 19a, 19b of the switching ring in such a manner as to cause it to follow the rotations of the external setting ring 20. Consequently, it is not only possible to orientate the brushes in a new angular position corresponding to the particular direction of rotation, but—if so desired—other electric switching actions can also be performed. If, for example, the setting ring of a hand drill is arranged on the inside and will therefore be only partly visible, appropriate openings in the housing will make it possible for the setting ring to be operated manually from the outside, for example, when a setting knob or a slide attached to the setting ring projects through the opening or is made accessible by it.

In an in itself arbitrary position of the end shield 12 (in the embodiment here illustrated within the carriers 14a, 14b) there are situated no more than two plug-in contacts (shown in FIG. 4 as 22a, 22b), which represent the two current supply points for the driving motor and must therefore be connected to an external current supply, which may be done, for example, by means of a plug connection to a plug-in circuitry module that is so designed as to make it possible—inasmuch as this may be necessary for the specific electric hand tool under consideration—to carry out other electric switching processes, cases in point being the "gas-giving function" in the case of a hand drill or the switching on and off of the hand tool in cases where the external setting ring is reserved for reversing the direction of rotation. As will readily be understood, this depends on the nature of the electric tool under consideration and, of course, also on the electric wiring within the motor as determined by the punched grid in use, since the switching ring of the electric motor is either in appropriate contact with this wiring or can be made to establish such contact after being duly rotated.

Note however that in FIG. 1, with a view to facilitating proper understanding, the tubular main housing has not been shown beyond the external setting ring 20 to the left in the plane of the drawing. This can be seen more clearly from FIG. 2, while FIG. 1 affords a better view of the details at the B-end of the motor. Hereinafter the description will specifically consider the features of a right-angle grinder, so that reference will always be made to an external setting ring, though this must not be deemed as limitative.

The sectional view of FIG. 1 shows how an annular shoulder 24 of the setting ring 20 bears against the facing outer end face edge 25 of the main housing, the shoulder being formed by steps on the inside of the setting ring. On the side opposite this shoulder, the setting ring is provided with an annular recess 26 that widens in the axial direction and serves to accommodate the edge of the forward end face of a rear cover part 27 of the housing, which is slid over an internal projection 28 of the main housing 11 until it comes up against the stop and, upon homing, secures the setting ring in position (FIG. 8). The projection 28 is forked and consists of an upper leg 28a and a lower leg 28b (FIG. 2), the interspace between these two legs permitting the insertion of the electric circuitry module, although this is not the object of the present invention. A lustre terminal 29 serves as a strain relief clamp for the current supply cable. The lower leg 28b of the main housing prolongation 28 can then be used, for example, to secure the rear cover 27 of the housing by means of an appropriate screw, indicated by reference 30 in FIG. 8, thereby preventing its axial withdrawal and also securing the setting ring 20 in position.

Figure 2:
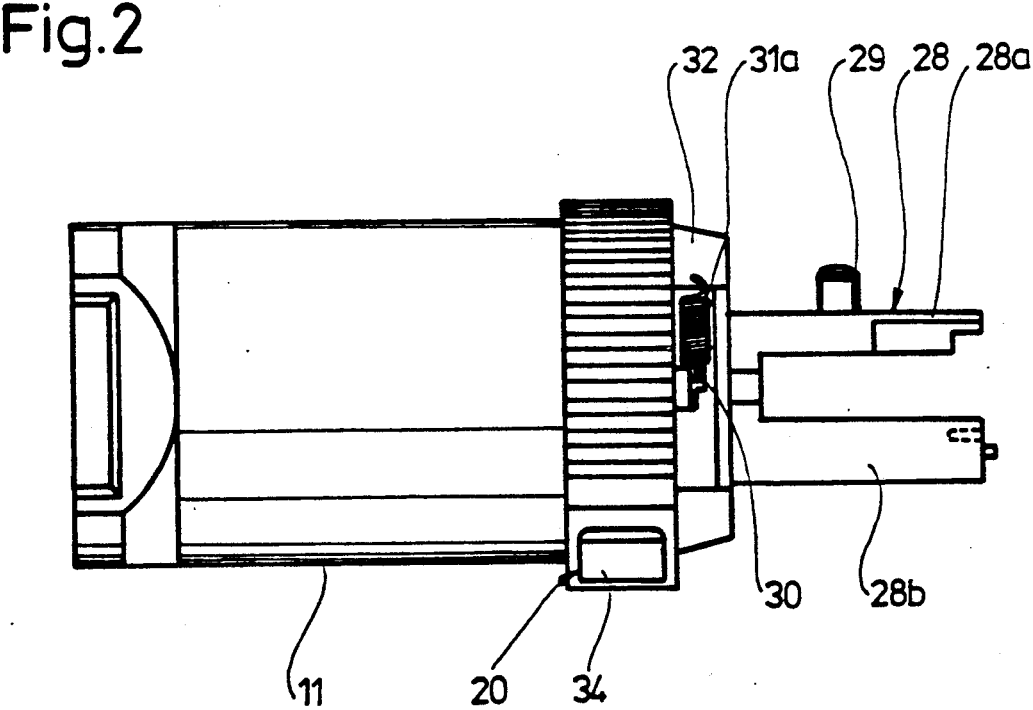
FIG. 2 shows the tubular main housing of an electric hand tool, specifically for a right-angle grinder, with fitted setting ring.

When the external setting ring 20 is used to switch the implement on and off, as is the case with the right-angle grinder here described, the switching ring also comprises a locking device with automatic return motion, all as shown in FIGS. 3, 4 and 2. In this case the ring is provided, first of all, with the return springs 31a, 31b, which are attached to the additional fixing pins 30 on the inwardly pointing projections 21a, 21b of the setting ring 20. At their rear end these springs are attached to conically tapering frames 32 that are fixed with respect to the housing and also carry the forked rearward projection 28 of the main housing 11.

The setting ring 20 also supports a stop device 33, which in the case of the embodiment here illustrated consists of a rocker 34 that is hinged more or less at the center and on one side terminates in a stop dog 35 bent through a right angle, while its other end is provided with a small pressure spring 36 (FIG. 5) and is therefore biased in such a manner that the stop dog 35 will be pressed inwards. It can readily be seen from FIGS. 3, 4 (with 5) and 6 that when the outer setting ring is displaced in a counterclockwise direction as indicated by the arrow A and the switching ring in the interior of the motor is made to perform a corresponding slave motion by means of the projections 21a, 21b, the stop dog 35, upon attainment of a predetermined position, will be pressed into a recess 37 fixed with respect to the housing, so that the external setting ring 20 will remain in this position even when the user lets go of it. In the case of the illustrated grinder embodiment, this arrangement can be used to switch on the implement and then to maintain it in the switched-on position as previously described, in which position the spring-controlled end of the rocker will be forced outwards as indicated by the arrow B in FIG. 3. If this end of the rocker is then pressed to switch the implement off, the stop dog 35 will be released from the retaining recess 37, so that the external setting ring 20 will jerk back into its original (rest) position and, given the appropriately great force exerted by the return springs, will cause the switching ring in the vicinity of the end shield at the B-end of the driving motor to move with it and will thus switch off the implement. If so desired, this mechanism can also be used when the setting ring serves for direction reversal, thereby obtaining automatic return to a preferred direction of rotation.

Since in the switched-off position the rear edge of the rocker switch 34 projects beyond the outer surface of the setting ring and the housing, it will be sufficient—always provided that the rocker is suitably located—for the user to put down the implement: the self-weight of the grinder will then ensure that the rocker is pressed back, thereby triggering the return motion of the setting ring 20. The implement will thus be switched off.

In FIG. 7, lastly, one can also note the tensioning springs 38a, 383b for the carbon brushes, as well as the separate seating recesses 39a, 39b, which serve to accommodate the radio interference suppressors of the driving motor and are likewise carried by the switching ring.

All the features referred to in the description, the claims and the drawing can be essential to the invention either individually or in any combination whatsoever.

We claim:

1. A switching device for energizing the drive motor of an electric tool of the type having a housing, and wherein the drive motor is self-contained and received in the housing of the electric tool,
   said motor including an end shield,
   a rotatable internal switching ring carried by said end shield and having a first position in which said motor is de-energized and being rotatable to a second position in which said motor is energized;
   said switching device comprising a manually activated setting ring rotatably mounted on the housing,
   said setting ring being aligned with said internal switching ring of said drive motor,
   connecting means for connecting said setting ring with said switching ring whereby rotation of said setting ring causes concomitant rotation of said switching ring to thereby rotate the switching ring from the off to the on position.

2. A switching device according to claim 1, further comprising biasing means positioned between said setting ring and said housing for biasing said setting ring to the off position.

3. A switching device according to claim 1, further comprising locking means positioned on said setting ring for locking said setting ring in the rotated position.

4. A switching device according to claim 3, wherein said locking means comprises a rocker switch on said setting ring, a recess in the housing, said rocker switch having a stop dog engageable with said recess in the housing when the setting ring is moved to its rotated position, and biasing means for biasing said stop dog into said recess thereby locking said setting ring in the rotated position.

5. A switching device according to claim 4, wherein said rocker switch is pivoted intermediate its ends, said rocker switch being sized and positioned to project beyond the surface of the housing when said stop dog is in said recess engaged position, whereby said stop dog is pivoted out of said recess when said rocker switch engages an object, whereby said locking means is deactivated.

6. A switching device for controlling the drive motor of an electric tool of the type having a housing, and wherein the drive motor is self contained and received in the housing of the electric tool,
   said motor including an end shield,
   a rotatable internal switching ring carried by said end shield,
   brush holders on said switching ring having brushes therein adjustable by rotation of said switching ring to respective angular positions to control the direction of rotation of said motor;
   said switching device comprising a manually activated setting ring rotatably mounted on said housing,
   said setting ring being aligned with said switching ring of the drive motor,
   connecting means for connecting said setting ring with said switching ring,
   said connecting means comprising at least one inwardly pointing projection engaging said switching ring whereby rotation of said setting ring causes rotation of said switching ring to thereby effect a change in a preselected electrical characteristic of said drive motor.

7. A switching device according to claim 6, wherein said setting ring includes inner annular shoulders engageable with the housing to axially position said setting ring on said housing.

8. A switching device according to claim 7, wherein said housing is provided with an edge, said setting ring having an internal annular recess rotatably engaging said housing edge, and an external annular recess on said setting ring, a rear cover having an edge received in said external annular recess to maintain said setting ring in place on the housing.

9. A switching device according to claim 8, and a skirt on said setting ring surrounding at least a portion of the housing.

10. A switching device according to claim 6, further comprising at least one biasing means positioned between said setting ring and said housing to bias said setting ring to a rest position.

11. A switching device according to claim 10, in which said biasing means comprises at least a spring.

12. A switching device according to claim 6, in which the switching ring has an initial position and biasing springs connected between said setting ring and said housing, said biasing springs being operable to return said setting ring and said switching ring to said initial position.

13. A switching device according to claim 6, wherein said internal switching ring includes an on position in which the motor is energized and an off position in which the motor in de-energized, said setting ring being adapted to rotate said internal switching ring to control operation of the motor.

14. A switching device according to claim 6, further comprising locking means on said setting ring for locking said setting ring in the rotated position.

15. A switching device according to claim 14, wherein said locking means comprises a rocker switch on said setting ring, a recess in the housing, said rocker switch having a stop dog engageable with said recess in the housing when the setting ring is moved to its rotated position, and biasing means for biasing said dog into said recess thereby locking said setting ring in the rotated position.

16. A switching device according to claim 15, wherein said rocker switch is pivoted intermediate its ends, said rocker switch being sized and positioned to project beyond the surface of the housing when said dog is in said recess engaged position, whereby said dog is pivoted out of said recess when said rocker switch engages an object, whereby said locking means is deactivated.

17. A switching device according to claim 6, wherein the switching ring is provided with an axially extending opening and said inwardly pointing projection comprises an axial projection receivable in said opening whereby said rings are connected together by axially sliding said setting ring onto the housing.

18. A switching device according to claim 6, wherein the housing includes an opening, and said setting ring is accessible for manual operation through said opening.

19. A switching device according to claim 18, wherein said setting ring is provided with an actuating element projecting through said opening.

* * * * *